US006693712B1

(12) United States Patent
Trezza

(10) Patent No.: US 6,693,712 B1
(45) Date of Patent: Feb. 17, 2004

(54) HIGH RATE OPTICAL CORRELATOR IMPLEMENTED ON A SUBSTRATE

(75) Inventor: John A. Trezza, Nashua, NH (US)

(73) Assignee: Teraconnect, Inc., Nashua, NH (US)

( * ) Notice: Subject to any disclaimer, the term of this patent is extended or adjusted under 35 U.S.C. 154(b) by 19 days.

(21) Appl. No.: 09/723,076

(22) Filed: Nov. 27, 2000

Related U.S. Application Data

(60) Provisional application No. 60/168,488, filed on Dec. 2, 1999.

(51) Int. Cl.7 .............................................. G01B 11/00

(52) U.S. Cl. ...................................... 356/399; 235/454

(58) Field of Search ................................ 235/454, 492; 356/399, 400, 401

(56) References Cited

U.S. PATENT DOCUMENTS

| | | | |
|---|---|---|---|
| 4,936,655 A | 6/1990 | Leib et al. | |
| 4,972,498 A | 11/1990 | Leib | |
| 4,993,809 A | 2/1991 | Leib et al. | |
| 5,488,504 A | 1/1996 | Worchesky | |
| 5,568,574 A | 10/1996 | Tanguay, Jr. et al. | |
| 5,619,496 A | 4/1997 | Weir | |
| 5,619,596 A | 4/1997 | Iwaki et al. | |
| 5,883,743 A | 3/1999 | Sloan | |
| 5,920,430 A | 7/1999 | Grycewicz | |
| 5,951,627 A | 9/1999 | Kiamilev | |
| 6,259,713 B1 * | 7/2001 | Hwu et al. | 372/109 |

FOREIGN PATENT DOCUMENTS

| | | |
|---|---|---|
| JP | 02000164971 A * | 6/2000 |
| JP | 02001298156 A * | 10/2001 |

OTHER PUBLICATIONS

M. Ajmone Marsan et al, Modelling Slotted Multi–Channel Ring All–Optical Networks, *IEEE*, 1997, pp. 146–153.

Marco Ajmone Marsan et al, Access Protocols for Photonic WDM Multi–Rings with Tunable Transmitters and Fixed Recievers, *SPIE*, pp. 59–72, vol. 26921 no date.

Carl Beckmann, Applications: Asynchronous Transfer Mode and Synchronous Optical Nrtwork, *Handbook of Fiber Optic Data Communication*, 1998, pp. 385–414, Academic Press.

Floyd E. Ross, An Overview of FDDI: The Fiber Distrbuted Data Interface, *IEEE Journal on Selected Areas in Communications*, Sep. 1989, pp. 1043–1051, vol. 7 No. 7.

PCT International Search Report dated Jun. 20, 2001 of International Application No. PCT/US00/42441 filed Dec. 1, 2000.

* cited by examiner

*Primary Examiner*—Karl D. Frech
(74) *Attorney, Agent, or Firm*—Maine & Asmus

(57) ABSTRACT

A high rate optical correlator is implemented on a substrate in which all of the optical devices are referenced to the flat surface of the substrate for optical alignment purposes by mounting the devices thereon. With the substrate surface as a reference point, alignment of the optical pieces is achieved to within a wavelength to eliminate the possibility of a "no correlation" result due to optical misalignment of the optical pieces. Additionally for the active elements, namely the laser, detector and spatial light modulators, interconnection of these devices and to drive sources is accomplished via direct coupling through the substrate so that the devices can communicate with each other through the silicon, thus to eliminate wire bonding and reduce pin count for the approximate 100,000 optical interconnects for a 256/256 array. Moreover, an epoxy frame which is milled at its top surface is used to mount an optical element over an active element for the alignment thereof.

30 Claims, 4 Drawing Sheets

HIGH RATE OPTICAL CORRELATOR IMPLEMENTED ON A SUBSTRATE

RELATED APPLICATIONS

The present application claims priority from U.S. Provisional Patent Application No. 60/168,488 filed Dec. 2, 1999.

FIELD OF INVENTION

This invention relates to optical correlators and more particularly to a method and apparatus for solving alignment and interconnect problems.

BACKGROUND OF THE INVENTION

Optical correlators have existed in the past to provide an indication of correlation between a sample image and a reference image to provide information as to the correspondence between the sample image and the reference image.

One type of optical correlator is a van der Lugt image correlator which involves the utilization of a laser source, a pair of spatial light modulators, a detector and a number of optical elements for redirecting light from the laser and to provide for a Fourier transform and an inverse Fourier transform so that an optical correlation can be made.

One of the most serious problems with the implementation of a van der Lugt image correlator is the alignment of the optical pieces. It has been found that a misalignment of even a few wavelengths can cause a discrepancy in the correlation result. So highly accurate is the image correlation that a misalignment can cause one portion of the sample image to be shifted only minutely with respect to a corresponding location on the reference image. The result of a misalignment of even a small amount degrades the correlation obtained between the reference image and the sample image.

If the reference image is not aligned with the sample image then for any given area there may be no correlation, when there would be a positive correlation if the alignment were perfect. If one does not obtain a correlation where it is supposed to be, then applications such as the inspection of a semiconductor devices, analysis of mammography images and pap smears, signal identification and other applications of ontical correlation will suffer.

Moreover, if the alignment is not perfect, there may be false correlations across the extent of the sample image, yielding false results overall.

In one application in order to inspect a significant area, the correlator may analyze as many as 256/256 pixels. With correlation being determined on a pixel by pixel basis, the amount of pin outs required to interconnect all the active devices can exceed 100,000. Not only is this physically difficult with external wiring, the reliability of such a device is in question.

Both optical correlation systems and their components are well known as can be seen by U.S. Pat. No. 5,920,430 for Lens List Joint Transform Optical Correlator for Precision Industrial Positioning Systems; U.S. Pat. No. 5,619,496 for Method and Apparatus for Optical Pattern Recognition; U.S. Pat. No. 5,488,504 for Hybridized Asymmetric Fabry-Perot Quantum Well Light Modulator; and U.S. Pat. No. 5,951,627 for "Photonic FFT Processor".

However, none of the aforementioned patents address the problems of alignment and intraconnection for optical correlators.

SUMMARY OF THE INVENTION

In order to obtain near perfect alignment and to provide a simplified system for interconnecting the active devices of an optical correlator, in the subject invention all of the optical pieces and the active devices are mounted on or in a semiconductor substrate, with the optical alignment being referenced to the flat surface of the substrate. In one embodiment, the active devices are either embedded in the semiconductor substrate or mounted on top of it, with the surface of the substrate providing a datum plane from which alignment is established. Thus, for instance, prisms, polarizing beamsplitters, spatial light modulators and detector arrays are all referenced to the datum plane established by the surface of the semiconductor substrate.

Moreover all optical elements such as traditional lenses, Fourier transform lenses, or other optical elements are mounted directly to the surface of the semiconductor substrate which serves as a reference or datum plane, thus providing the alignment required.

Mounting the optical pieces on the semiconductor substrate means for instance that the output of a laser when redirected via a prism, through a beamsplitting device and imaged onto another prism from whence it is redirected to the surface of a spatial light modulator provides an accurately controllable alignment axis for the beam. Because of the alignment provided by the surface of the substrate the beam reflected by the spatial light modulator is directed back along this accurately determined optical axis where it is redirected by a reflective beamsplitter along a further accurately controlled axis where it impinges upon a second prism, there to be redirected onto the surface of a second spatial light modulator.

The accuracy with which light from the first spatial light modulator is directed onto the second spatial light modulator is indeed critical because while the first spatial light modulator carries the sample image, the second spatial light modulator carries the reference to which the sample image is to be compared.

Any misalignment between the optical axis on which the light travels from the first spatial light modulator to the second spatial light modulator severely impacts the accuracy of the correlation. This is because locations on the sample will not correspond to the corresponding locations on the reference.

Having established a mechanism by which an alignment can be preserved so that on a pixel by pixel basis the images can be compared, there is nonetheless the necessity of interconnecting the spatial light modulators to drive sources which are offchip. There is also the necessity for connecting to the detector array so that some offchip device can measure the degree of correlation. Alternatively, a correlation engine may be embedded into the substrate to which the detector must be connected.

In a further aspect of the subject invention, a mounting technique utilizes an epoxy frame, the top surfaces of which are polished flat to provide a plane parallel to the datum plane established by the surface of the substrate. This frame is used to mount optical elements above an active device and still provide accurate alignment.

In the subject invention, interconnection to the arrays of pixels which exist on the spatial light modulators and indeed to the CCD detector elements are carried through embedded electrical circuits within the substrate. This eliminates the large number of connections which would be necessary and, for a 256/256 array would eliminate external connections which could number as many as 100,000.

Not only is the internal interconnection of the active devices of the correlator simplified through the utilization of the embedded circuits within the semiconductor substrate, pathlinks can be reduced significantly.

In one embodiment, in the subject invention a so-called smart CMOS platform is provided to solve the connection problem mentioned above.

Thus in one embodiment the subject image correlator includes a silicon substrate with the following elements mounted to the surface of the substrate or embedded in it: a laser diode, a first prism, a first beamsplitter, a second beamsplitter, an input spatial light modulator, a first detector array, an inverse Fourier transform lens, second beamsplitter, and a filter spatial light modulator. In addition a Fourier transform lens is positioned between the two beamsplitter, with all the devices being integrated directly onto a silicon chip.

In one embodiment the detector array is preferably a pixilated detector array using MED pixels, where MED stands for modulator/emitter/detector. Alternatively other technologies such as silicon photodiode or CCD array technology are within the scope of the subject invention. Passive components, namely the prisms, beamsplitters and lenses, can be integrated directly into subsystems, also referenced to the surface of the substrate for convenient alignment and assembly. Alternatively, the Fourier transform lens may be replaced with a holographic lens.

Note, if the two dimensional detector arrays are replaced with linear arrays, then the correlator can be used for spectral analysis applications including voice recognition.

With the ability to provide appropriate alignment utilizing the van der Lugt correlator architecture with multiple quantum well spatial light modulators, the large increase in correlation rate between an image candidate and a reference is preserved due to the small size of the correlator and the enormous processing speeds which are achievable due to the small size. The subject system enables real time correlation of single reference images and near real time correlation with multiple reference images utilizing data delivery by the CMOS circuitry which is embedded in the substrate as well as the utilization of multiple quantum well spatial light modulators.

In summary, a high rate optical correlator is implemented on a substrate in which all of the optical devices are referenced to the flat surface of the substrate for optical alignment purposes by mounting the devices thereon. With the substrate surface as a reference point, alignment of the optical pieces is achieved to within a wavelength to eliminate the possibility of a "no correlation" result due to optical misalignment of the optical pieces. Additionally for the active elements, namely the laser, detector and spatial light modulators, interconnection of these devices and to drive sources is accomplished via direct coupling through the substrate so that the devices can communicate with each other through the silicon, thus to eliminate wire bonding and reduce pin count for the approximate 100,000 optical interconnects for a 256/256 array. Moreover, an epoxy frame which is milled at its top surface is used to mount an optical element over an active element for the alignment thereof.

BRIEF DESCRIPTION OF THE DRAWINGS

These and other features of the subject invention will be better understood in connection with the Detailed Description in conjunction with the Drawings of which.

DETAILED DESCRIPTION

In the subject invention, in one embodiment, a system is described that uses flip-chip mounted. GaAs based spatial light modulators to enable the implementation of a high-speed correlator on a chip. The illustrated embodiment exploits optoelectronic flip-chip techniques to provide high-speed spatial light modulation with a significant increase in frame rate over that currently available.

Figure 1:
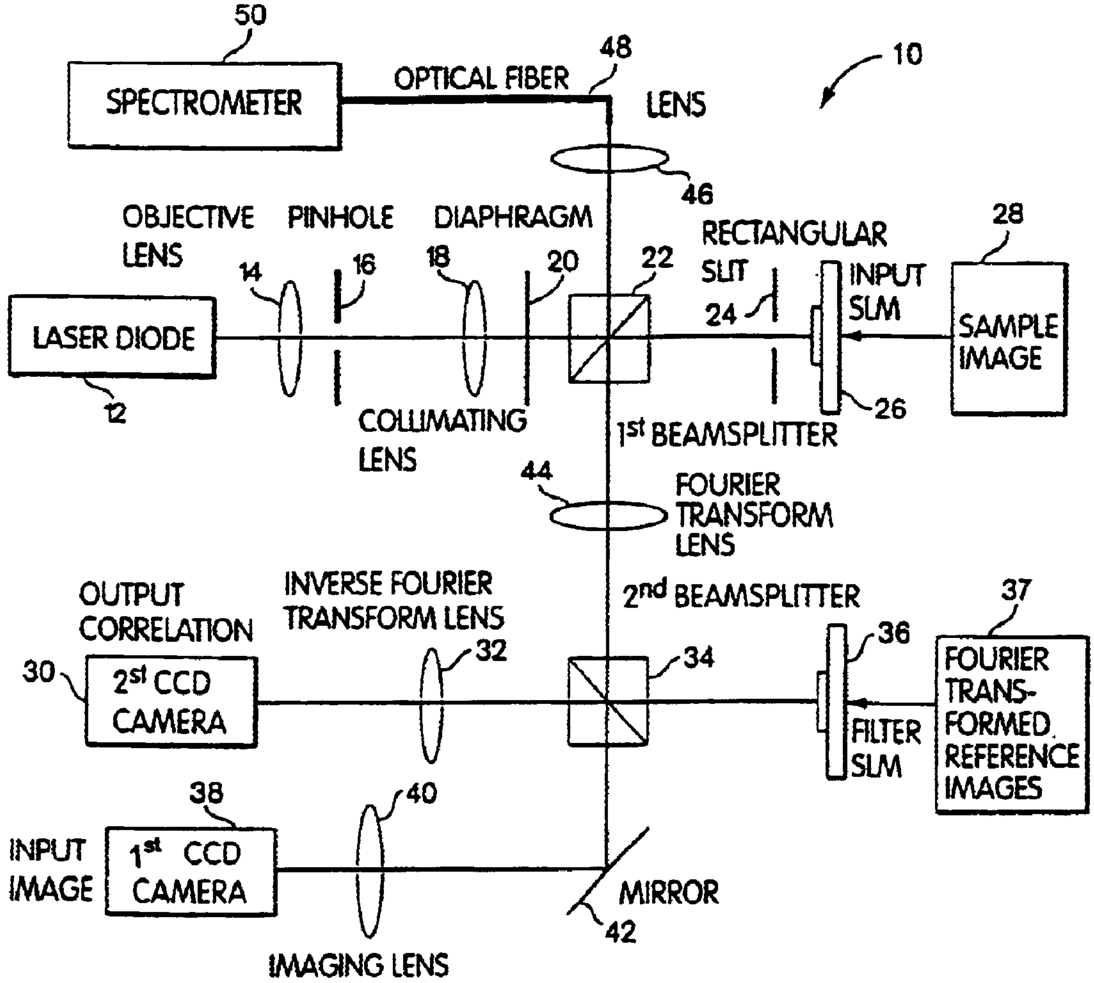
FIG. 1 is block diagram of an optical comparator to be implemented on a substrate in accordance with the subject invention.

Referring now to FIG. 1, a block diagram of a van der Lugt optical comparator is shown, which is one type of comparator which may be implemented by the subject method of mounting optical elements on the surface of a silicon substrate.

In FIG. 1, the subject correlator 10 includes a laser diode 12, an objective lens 14, a pinhole 16, a collimating lens 18, a diaphragm 20, a first beamsplitter 22, a rectangular slit 24, and an input multiple quantum well based spatial light modulator 26. Spatial light modulator 26 is provided with a sample image 28.

The system further includes a first CCD camera 30, an inverse Fourier transform lens 32, a second beamsplitter 34, and a filter multiple quantum well based spatial light modulator 36. Reference images are Fourier transformed and provided as illustrated at 37 to modulator 36. In addition, the system includes a second CCD camera 38, an imaging lens 40, and a mirror 42. Finally, the system includes a Fourier transform lens 44, a lens 46, an optical fiber 48, and a spectrometer 50.

In one embodiment, the laser diode operates at 860 nm, but the subject invention would work equally well if it operated in the range of 400 nm to 1600 nm. The pinhole is 25 um in diameter. The collimating lens has a focal length of 300 mm. The combination of the objective lens 14, the pinhole 16, and the collimating lens 18 form a beam expander with a spatial filter. Preferably, the Fourier transform lens 44 has a focal length of 231 mm, and that of the inverse Fourier transform lens 32 is 250 mm. The imaging lens 40 has a focal length of 225 mm. Both beamsplitters 22 and 34 are 50:50 beamsplitters.

In the present invention, the spatial light modulators are formed of arrays of multiple quantum well (MQW) GaAs based devices. The multiple quantum well spatial light modulator has a flip chip design in which a CMOS substitute has a ball grid array of solid balls. On top of this substrate is an array of multiple quantum well devices. A quartz cover is provided on epoxy standoffs in one embodiment. Alternatively the cover could be made to touch the top of the pixels and so would not be resting on epoxy standoffs.

Note that the multiple quantum level devices can switch as quickly as an electrical signal to them can be changed. The bandwidth is approximately 100 GHz. This means that the maximum frame rate is 100 billion frames/second instead of 10,000 frames/sec that is the best case with liquid crystal based spatial light modulators. The current state of the art with GaAs based devices is 300,000 frames/sec, where the lateral data rate into the devices from the CMOS circuitry is the limiting factor.

Since in the existing art the limiting factor is how the spatial light modulator is constituted, the use of a multiple quantum well device clearly means that there is an increase in the number of frames per second that can be processed. In fact, there is an increase in several orders of magnitude in the speed of the correlator in the present invention over the prior art. Thus, the subject invention solves the need to implement an optical image correlator that is significantly faster than are correlators made with liquid crystals.

The system depicted in FIG. 1 is a van der Lugt image correlator and it is based on Fourier transform techniques that compare converted input images with reference images provided by the filters. Filters are created by Fourier transforming reference images, and converting them to binary amplitude data.

System operation begins with the image 28 to be identified being coupled to input modulator 26. Image 28 is first illuminated by a collimated laser beam from laser 12. The modulated image is reflected onto Fourier transform lens 44 where it is converted to a Fourier transformed image. The transformed image is then directed to modulator 36 which contains a Fourier transformed rendition of the image to be recognized. The identification process involves multiplying the Fourier transform of the input image with the Fourier transformed reference image. The output then passes through inverse Fourier transform lens 32 and is displayed on CCD camera 30. A positive correlation appears as a bright spot, or a correlation peak. The second CCD camera, camera 38, allows the operator to see the input image.

As mentioned above, optical correlation is performed using reference filters. The Fourier transform filter is designed using amplitude encoded binary phase only principals (BPOF) with the BPOF filters used because of their high discrimination capability.

Thus, the present method for operating a high-speed optical correlator consists of displaying the image to be identified on the input spatial light modulator; illuminating the image with a collimated laser beam; passing the modulated image through a Fourier transform lens; projecting the transformed image onto the modulator which contains a reference filter of the image to be recognized, thus multiplying the Fourier transformed input image with the reference filter; passing the output through an inverse Fourier transform lens; and displaying that image on a CCD camera. Rapid presentation of reference images for correlation is provided by repeating the above steps with different reference images until a positive correlation is found.

It will be appreciated that optical image correlation is based on a two dimensional projection of a three dimensional object. It depends strongly on the filter image being quite close in orientation to the orientation of the image being identified. With the use of multiple quantum well devices, the extraordinarily high frame rate allows virtually every conceivable orientation of candidate images to be correlated with an image, and for that comparison to be done within seconds, i.e., in real time.

As a result a high-speed optical correlator is provided that can perform correlations at orders of magnitude higher speed than previous systems.

Another novel aspect is an optical image correlator with the functional capability of 300,000 frames/sec and expandability to billions of frames per second.

Figure 2:
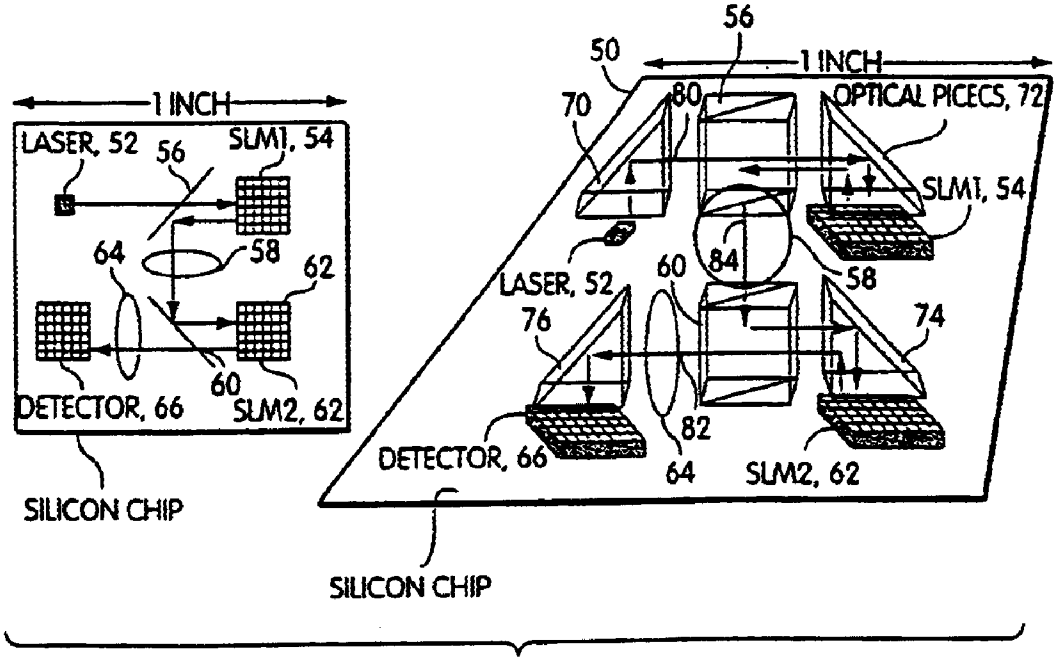
FIG. 2 is a diagrammatic illustration of the mounting of optical pieces on a substrate both from a top view and in an isometric view.

However implementation of such a correlator depends on critical alignment of the optical elements. How this is accomplished is now explained:

Referring now to FIG. 2, the semiconductor substrate onto which the optical elements are to be either embedded or mounted on is illustrated by reference character 50, and in one embodiment is only one inch by one inch in dimension.

As can be seen from the top view, a laser 52 is utilized to illuminate spatial light modulator 54 through a polarizing beamsplitter 56. The output of the spatial light modulator 54 is redirected by beamsplitter 56 through a Fourier transform lens 58 and is redirected by a polarizing beamsplitter 60 to a second spatial light modulator 62. The output of spatial light modulator 62 is transmitted through an inverse Fourier transform lens 64 to a detector 66.

As can be seen from the isometric view, the laser and detector may be embedded in the silicon chip, as can be the spatial light modulators. Alternatively the spatial light modulators may be built up above and on top the silicon chip, with prisms 70, 72, 74 and 76 mounted on top of these active devices to redirect the light traveling horizontally to a vertical direction and vice versa.

It will be appreciated that the horizontal optical light paths, here shown at 80 and 82, are critical in the alignment of images from spatial light modulator 54 to spatial light modulator 62. These prisms and in fact the mounting and orientation of the beamsplitters are critical to determining the light path direction. The light path direction is critical not only along horizontal paths 80 and 82, but also along horizontal path 84.

As mentioned hereinbefore, with misalignment there can be an offsetting of the image from spatial light modulator 54 onto spatial light modulator 62 which materially affects the correlation obtainable.

Figure 3:
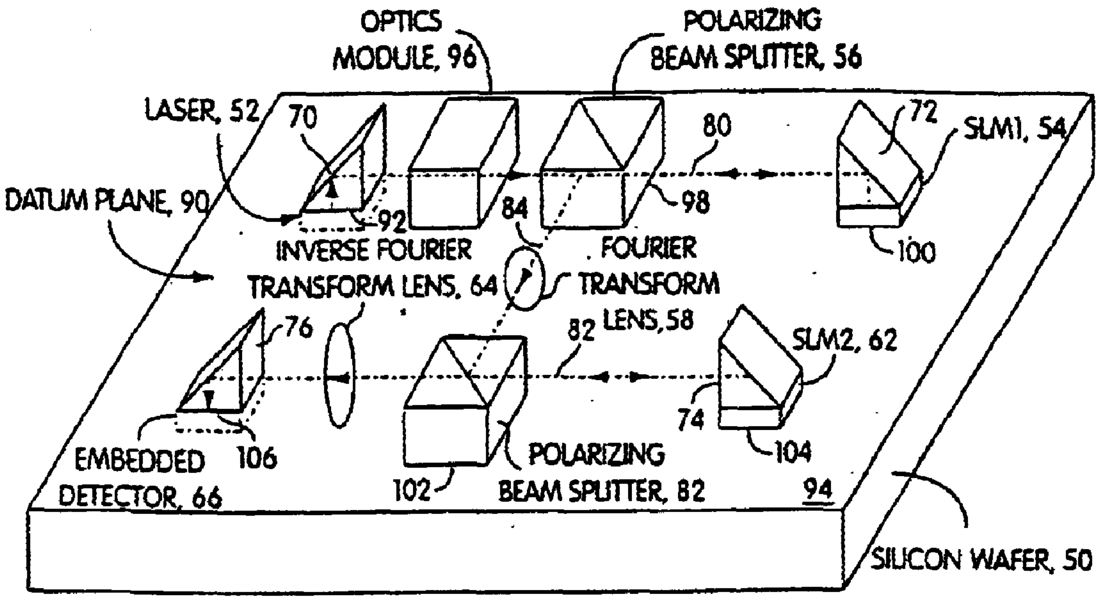
FIG. 3 is a diagrammatic representation of the physical mounting of a optical elements on the surface of a silicon wafer to implement the optical correlator of FIG. 1; and, FIGS. 4A–4D indicate method steps for mounting active devices on the substrate of FIG. 3, indicating the mounting of an optical element above an active device and the alignment of the optical axis thereof through the utilization of an epoxy frame which has been mechanically milled such that the top surfaces of the frame are parallel to the datum plane associated with the top surface of the substrate.

As can be more accurately seen in FIG. 3, the criticality of the light paths are key to the accuracy of the correlation or in fact whether there will be a correlation. Here it can be seen that datum plane 90 is established by the polished surface of silicon wafer 50, which in a preferred embodiment is optically flat.

This datum plane establishes the location of prism 70 above laser 52 due to the fact that the bottom edge 92 of the prism fits directly on the top surface 94 of silicon wafer 50. This insures that the light from laser 52 is directed exactly along light path 80 through, in one embodiment, an optics module 96. In one embodiment, optics module 96 includes objective lens 14, pinhole 16, collimating lens 18 and diaphragm 20 of FIG. 1.

The light beam exits the optics module 96 and impinges upon polarizing beamsplitter 56 which again has a bottom edge 98 which determines the orientation of the polarizing beamsplitter relative to datum plane 90.

Thereafter the optical beam exits the polarizing beamsplitter and impinges upon prism 72, whereupon it is redirected onto spatial light modulator 54.

Spatial light modulator 54 is positioned on the datum plane via its lower edge 100, as will be described in connection with FIGS. 4A–4C.

Moreover the alignment of prism 72 with respect to datum plane 90 is established through the utilization of a frame to be described in connection with FIGS. 4A–4D so that the orientation of the prism is in fact determined through the utilization of datum plane 90.

Likewise polarizing beamsplitter 82 is located on surface 94 with a lower edge 102 providing for the alignment orientation of this optical element.

In the same way as spatial light modulator 54, spatial light modulator 62 is mounted on surface 94 with its lower edge

104 referenced to surface 94. Likewise prism 74 is referenced to the datum plane through the techniques described in FIGS. 4A–4D.

It will also be noted that prism 76 has a lower edge 106 which rests on the surface of the silicon chip, namely surface 94, with detector 66 embedded therebeneath.

It will appreciated that both the Fourier transform lens and the inverse Fourier transform lens can be mounted in housings to provide for accurate alignment of their optical axes along paths 84 and 82 respectively.

Figure 4A:
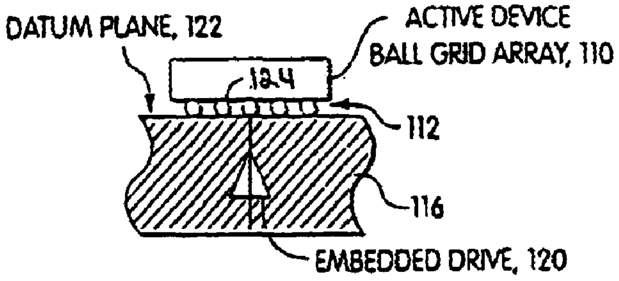

Referring now to FIG. 4A in order to accurately align an optical element above an active device, an active device 110 is provided with a ball grid array 112 of exceedingly accurately sized balls. The ball grid array serves to connect the active device to the surface 114 of a substrate 116 in which are embedded active elements, one of which is illustrated by embedded drive 120.

The ball grid array serves to connect an active device on the surface of the substrate to either embedded devices within the substrate or interconnection circuits.

Here it will be seen that the bottom surface 122 of active device 110 is parallel to datum plane 122 provided by the polished surface of substrate 116.

Figure 4B:
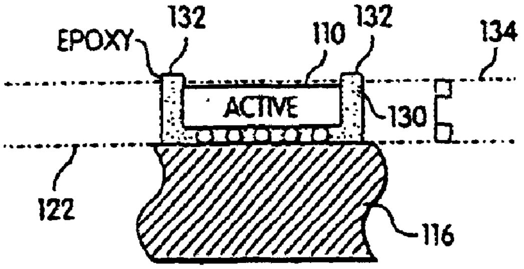

Referring now to FIG. 4B an epoxy frame 130 is deposited around active device 110 with the tops of the frame 132 extending above a plane 134 which is parallel to plane 122.

Figure 4C:
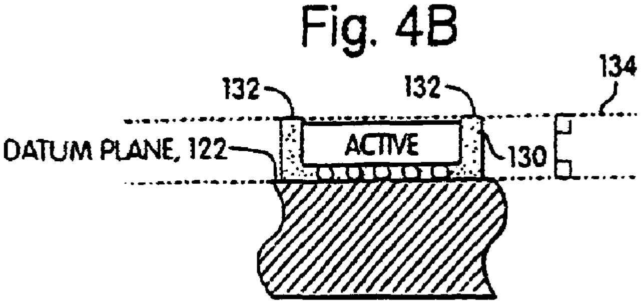

As illustrated in FIG. 4C, the top surfaces of frame 130 are milled down to plane 134, with the plane of the top surface of the frame being parallel to datum plane 122. This provides an extremely accurate surface onto which any optical elements above the active device may be mounted.

Figure 4D:
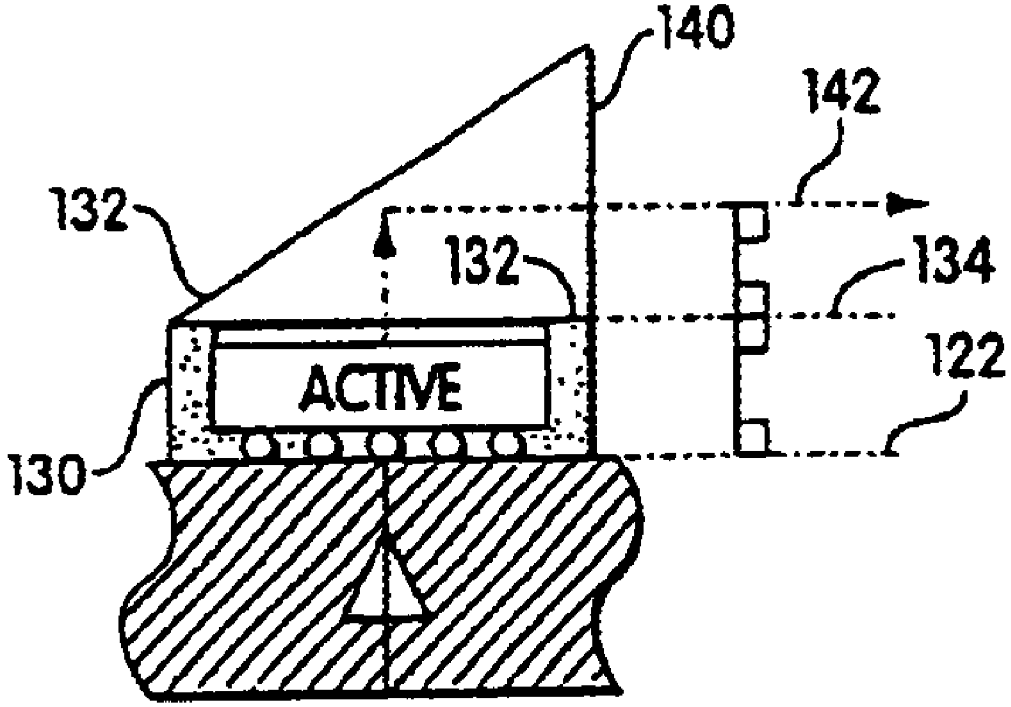

As shown in FIG. 4D, a prism 140 is mounted to top surface 132 of frame 130, thus establishing an optical path 142 which is parallel not only to plane 134 but also to datum plane 122.

What can be seen is that the mechanical milling of the frame top surface establishes a reference plane for the alignment of the optical element on top of it by virtue of the placement of prism 140 on top of this highly accurate surface.

Having now described a few embodiments of the invention, and some modifications and variations thereto, it should be apparent to those skilled in the art that the foregoing is merely illustrative and not limiting, having been presented by the way of example only. Numerous modifications and other embodiments are within the scope of one of ordinary skill in the art and are contemplated as falling within the scope of the invention as limited only by the appended claims and equivalents thereto.

What is claimed is:

1. A method for improving alignment accuracy of an optical correlator, comprising:

providing a substrate having a flat surface, wherein at least one active device is embedded within said substrate;

mounting at least one optical element above said at least one active element; and aligning said at least one optical element to said flat surface.

2. The method of claim 1, wherein the embedded active device is selected from the group comprising: a laser, a detector, and a spatial light modulator.

3. The method of claim 2, wherein said spatial light modulator is a multiple quantum well device embedded in said substrate.

4. The method of claim 1, wherein said active device is a detector array selected from the group comprising: modulator/emitter/detector (MED) pixels, photodiodes and charge coupled devices (CCD).

5. The method of claim 1, wherein said at least one optical element is selected from the group comprising prism, beamsplitter, Fourier transform lens, imaging lens, collimating lens, objective lens, pinhole, diaphragm, mirror, holograph lens and inverse Fourier transform lens.

6. The method of claim 1, further comprising coupling said active device to CMOS circuitry embedded in said substrate.

7. The method of claim 1, further comprising providing a frame around said active device, processing a top surface of said frame to be parallel to said flat surface, and mounting the optical element to the top surface of the frame.

8. The method of claim 7, wherein the processing is milling.

9. The method of claim 7, wherein the frame is epoxy.

10. A method for interconnecting an optical correlator, comprising:

providing a silicon substrate with a top surface;

mounting at least one active element on said substrate;

mounting at least one optical element above said at least one active element;

coupling said optical element and said active element to said substrate;

interconnecting said optical element and said active element within said substrate; and optically aligning said optical element and said active element to said top surface.

11. The method of claim 10, wherein the embedded active device is selected from the group comprising: a laser, a detector, and a spatial light modulator.

12. The method of claim 11, wherein said spatial light modulator is a multiple quantum well device flip chip mounted on a ball grid array to said substrate.

13. The method of claim 10, wherein said at least one optical element is selected from the group comprising prism, beamsplitter, Fourier transform lens, imaging lens, collimating lens, objective lens, pinhole, diaphragm, mirror, holograph lens and inverse Fourier transform lens.

14. The method of claim 10, further comprising coupling said active device to CMOS circuitry embedded in said substrate.

15. The method of claim 10, wherein said active device is a detector array selected from the group comprising: modulator/emitter/detector (MED) pixels, photodiodes and couple charged devices (CCD).

16. The method of claim 10, further comprising providing a frame around said active device, processing a top surface of said frame to be parallel to said flat surface, and mounting the optical element above the active device to the top surface of the frame.

17. The method of claim 16, wherein the processing is milling.

18. The method of claim 16, wherein the frame is epoxy.

19. An optical correlator apparatus with improved alignment accuracy, comprising:

a substrate with a flat surface;

at least one active device embedded in said substrate;

at least one optical element mounted above said substrate, wherein said active device and said optical element are optically aligned to said flat surface.

20. The apparatus of claim 19, wherein said optical correlator is a van der Lugt optical comparator.

21. The apparatus of claim 19, wherein the active device is selected from the group comprising: a laser, a detector, and a spatial light modulator.

22. The apparatus of claim 21, wherein said spatial light modulator is a multiple quantum well device.

23. The apparatus of claim 19, wherein said at least one optical element is selected from the group comprising prism, beamsplitter, Fourier transform lens, imaging lens, collimating lens, objective lens, pinhole, diaphragm, mirror, holograph lens and inverse Fourier transform lens.

24. The apparatus of claim 19, wherein said active device is coupled to CMOS circuitry embedded in said substrate.

25. The apparatus of claim 19, wherein said active device is a detector array selected from the group comprising: modulator/emitter/detector (MED) pixels, photodiodes and couple charged devices (CCD).

26. The apparatus of claim 19, further comprising a frame around the active device, with a top surface of said frame parallel to said flat surface, and wherein the optical element is mounted to the top surface of the frame.

27. The apparatus of claim 26, wherein the frame is epoxy.

28. An optical correlator, comprising:

a silicon substrate with a top surface;

at least one active element on said substrate;

at least one optical element disposed above said active element;

wherein said optical element and said active element are coupled to said substrate;

and, wherein said optical element and said active element are optically aligned to said top surface.

29. The apparatus of claim 28, wherein the active elements are spatial light modulators formed of arrays of multiple quantum well devices mounted to a ball grid array on said substrate.

30. The apparatus of claim 28, wherein the active elements are spatial light modulators formed of arrays of multiple quantum well devices mounted to a ball grid array on said substrate connecting said spatial light modulators to drive circuitry in said substrate.

* * * * *